United States Patent [19]
Warner

[11] 4,344,286
[45] Aug. 17, 1982

[54] ENERGY CONVERTER MACHINE

[76] Inventor: Norman S. Warner, Apartado 118, Heredia, Costa Rica

[21] Appl. No.: 139,057

[22] Filed: Apr. 10, 1980

[51] Int. Cl.³ .............................................. F03C 5/00
[52] U.S. Cl. ...................................... 60/531; 60/530; 60/641.1; 417/329; 417/343
[58] Field of Search .............. 60/641.1, 530, 531, 60/516, 676, 721, 675; 417/329, 343, 379

[56] References Cited

U.S. PATENT DOCUMENTS

| | | | |
|---|---|---|---|
| 866,878 | 9/1907 | McCarthy | 417/329 |
| 1,289,435 | 12/1918 | Fulton | 60/531 |
| 3,509,716 | 5/1970 | Avory | 60/531 X |
| 4,019,325 | 4/1977 | Murphy, Jr. | 60/643 |
| 4,121,420 | 10/1978 | Schur | 60/531 |
| 4,203,295 | 5/1980 | Siegel | 60/531 |

*Primary Examiner*—A. Michael Chambers
*Attorney, Agent, or Firm*—Robert D. Farkas

[57] ABSTRACT

An energy convertor machine generally includes an elongated member and at least two sets of one or more elastomeric bag members, each elastomeric bag member having a liquid with a low vaporization temperature disposed therein, wherein heating means and a cooling means are provided, wherein one set of elastomeric bag members is being heated while the other set is being cooled thereby causing one set of elastomeric bag members to be expanded while the other set of elastomeric bag members are contracting. A means for rotating the elongated member is provided, wherein the rotating means is activated by the alternate expansion and contraction of the two sets of elastomeric bag members.

6 Claims, 3 Drawing Figures

ENERGY CONVERTER MACHINE

FIELD OF THE INVENTION

An energy convertor machine generally includes an elongated member and at least two sets of one or more elastomeric bag members, each elastomeric bag member having a liquid with a low vaporization temperature disposed therein, wherein heating means and a cooling means are provided, wherein one set of elastomeric bag members is being heated while the other set is being cooled thereby causing one set of elastomeric bag members to be expanded while the other set of elastomeric bag members are contracting. A means for rotating the elongated member is provided, wherein the rotating means is activated by the alternate expansion and contraction of the two sets of elastomeric bag members.

BACKGROUND OF THE INVENTION

A number of U.S. Patents are related to various type pump devices but these U.S. Patents are non-applicable to the instant invention. These U.S. Patents are U.S. Pat. Nos. 217,775; 341,453; 386,516; 426,184; 444,744; 452,852; 991,493; and 2,308,497.

SUMMARY OF THE INVENTION

An energy convertor machine generally includes an elongated member and at least two sets of one or more elastomeric bag members, each elastomeric bag member having a liquid with a low vaporization temperature disposed therein, wherein heating means and cooling means are provided, wherein one set of elastomeric bag members is being heated while the other set is being cooled thereby causing one set of elastomeric bag members to be expanded while the other set of elastomeric bag members are contracting. A means for rotating the elongated member is provided, wherein the rotating means is activated by the alternate expansion and contraction of the two sets of elastomeric bag members.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figures 2, 3:
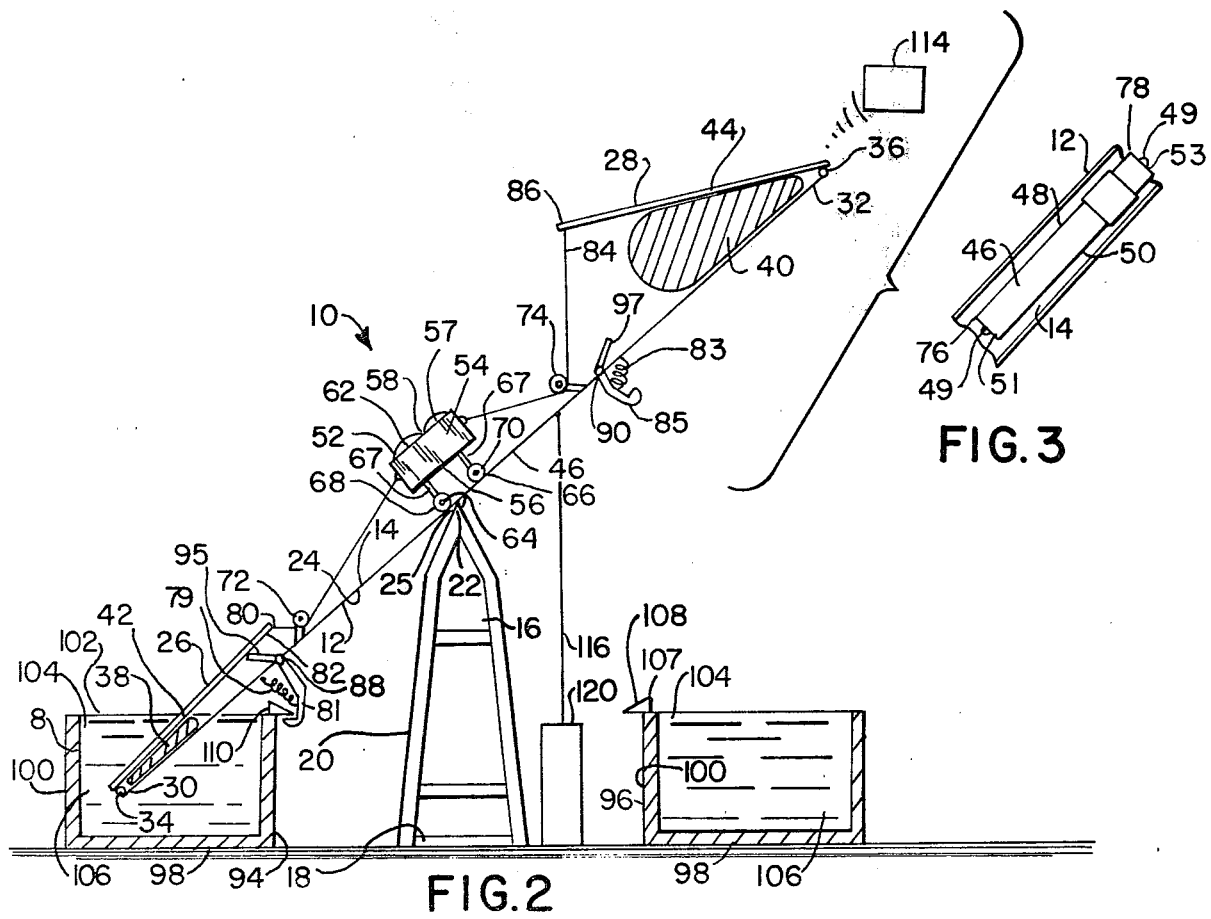
FIG. 2 illustrates a side view of a modified embodiment of an energy convertor machine.
FIG. 3 illustrates a top view of the energy convertor machine of the apparatuses shown in FIGS. 1 and 2.

Turning now descriptively to the drawings, in which similar reference characters denote similar elements throughout the several views, FIGS. 2-3 shows an energy convertor machine 10 adaptable for converting heat energy into mechanical work as depicted or into electrical energy (not shown). The machine 10 generally comprises an elongated member 12 having a top planar surface 14 and an upwardly extending support member 16 which has a base 18 and a plurality of upwardly extending walls 20 which converge together and terminate in a sharp top elongated edge 22. The bottom surface 24 of the elongated member 12 is center balanced on edge 22, wherein hinge members 25 communicate between the support member 16 and the bottom surface 24 of the elongated member 12. The combination of the elongated member 12 and support member 16 is generally termed a see-saw device. One of a pair of elongated elements 26, 28 is joined to each end 30, 32 of the elongated member 12 by hinge elements 34, 36. One of a pair of elastomeric bag members 38, 40 is secured to the top surface 14 of the elongated member 12 at each end 30, 32 thereof, such that elongated element 26 engages the top surface 42 of the elastomeric bag member 38 and element 28 engages the top surface 44 of bag member 40. Each elastomeric bag member 38, 40 is composed of elastomeric type which can be a natural or synthetic rubber such as butyl rubber, neoprene or isobutylene. A liquid having a low vaporization temperature such as Freon is disposed in each elastomeric bag member 38, 40. A track assembly 46 having a pair of elongated rail members 48, 50 is longitudinally disposed and secured on the top planar surface 14 of the elongated member 12, wherein the track assembly 46 extends between the bag members 38, 40. A stop member 49 is secured to each end 51, 53 of track assembly 46. A dolly member 52 comprises a body 54 having a base 56, at least one upwardly extending wall 58, a chamber therein, and an open top 62; a pair of axle members 64, 66; and a pair of wheels 68, 70 affixed on each axle member 64, 66, wherein each axle member 64, 66 is journaled for rotation through bearing members 67 which are secured to and extending downwardly from the bottom surface of base 56. Weights 57 are disposed in the chamber of dolly member 52. The wheel members 68, 70 of dolly member 52 are rotatably disposed on rail members 48, 50 such that when elongated element 28, 26 is tilted from a horizontal plane the dolly member 52 moves along the track assembly 46 towards the upper end of elongated member 12. A pair of pulley members 72, 74 are affixed onto the upper surface 14 of the elongated member 12, wherein one of the pully members 72 is disposed between a first end 76 of track assembly 46 and the first bag member 38 and the other pulley member 74 is disposed between the other end 78 of track assembly 46 and the second bag member 40. A first chord member 80 is secured at one end thereof to an outer free end 82 of elongated element 26, wherein chord member 80 extends through pulley member 72 and is secured at its other end to dolly member 52. A second chord member 84 is secured at one end thereof to an outer free end 86 of elongated element 28, wherein chord member 84 extends through pulley member 74 and is secured at its other end to dolly member 52. A pair of latch trigger elements 88, 90 are rotatably mounted in holes of elongated member 12, wherein one of the latch trigger elements 88 is disposed on one side of the center of the elongated member 12 and the other latch trigger element 90 is disposed on the other side of the center of the elongated member 12 such that the handle portion 95 of the latch trigger element 88 extends above elongated member 12 and a handle portion 97 of latch trigger element 90 also extends above elongated member 12. A spring member 79 communicates between the latch portion 81 of latch trigger element 88 and the bottom surface of elongated member 12 and another spring member 83 communicates between the latch portion 85 of latch trigger element 90 and the bottom surface of the elongated member 12. A pair of open tank members 94, 96 are provided, wherein each tank member 94, 96 has a base 98 at least one upwardly extending wall 100, and an open top 102, and a chamber 104, therein, wherein a fluid 106 such as water having a low freezing temperature is disposed in chamber 104. A first latch member 108 is affixed to the upper rim 107 of tank member 96 and a second latch member 110 is affixed to the upper rim 107 of tank member 94. Tank member 94 is positioned on one side of support member 16 and below end 30 of the elongated member 12 such that when end 30 is depressed downwardly, end 30 of the elongated member 12 and bag member 38 affixed thereon become immersed in the liquid 106 disposed in tank member 94. Tank member 96 is positioned on the other side of support member 16 and below end 32 of the elongated member 12 such that when end 32 is depressed downwardly, end 32 of elongated member 12 with bag member 40 becomes immersed in the liquid 106 disposed in tank member 96.

An external hot air source such as a hot air blower or other heat source means 114 is provided, wherein the blower 114 is positioned such that hot air impinges upon bag members 38, 40, when either bag member is in a raised condition. An elongated rod member 116 is affixed to the bottom surface of elongated member 12 and extends downwardly therefrom wherein the lower end of rod member 116 is in communication with a mechanical work device 120 such as a pump as depicted in FIG. 2.

In use bag member 38 which is in a collapsed state is disposed in fluid 106 in tank member 94, since the cold fluid 106 has caused the gas in bag member 38 to condense into a liquid. Latch trigger element 88 is locked onto latch 110. End 32 of elongated member 12 and bag member 40 are disposed above and outside of tank member 96. As the heat from the hot air means 114 impinges upon bag member 40, the condensed liquid in bag member 40 is transformed into a gas provided sufficient heat is imparted to raise the liquid above its vaporization temperature, thereby causing bag member 40 to expand thereby causing elongated element 28 to move upwardly and away from elongated member 12. Chord member 84 is pulled taut as elongated 28 moves upwardly thereby causing dolly member 52 to move upwardly on track assembly 46 towards end 32 of elongated member 12. As dolly member 52 moves upwardly towards end 32 of elongated member 12, chord member 80 is pulled taut thereby causing elongated element 26 to be pulled downwardly towards elongated member 12 and to engage against handle portion 95 thereby causing latch trigger element 88 to rotate and disengage from latch 110. The latch assembly prevents the premature raising of the bag members 40, 42 from their respective tank members 94, 96. The weight of dolly member 52 and weights 57 will cause end 32 of elongated member 12 and bag member 40 to move downwardly and become immersed in fluid 106, wherein latch trigger element 90 engages on latch 108. The gas in bag member 40 begins to condense due to the bag member 40 being immersed in the cold fluid 106 contained in tank 96. As end 32 of elongated member 12 moves downwardly, it causes rod 116 to move downwardly thereby causing mechanical work to be done on device 120. As end 32 of elongated member 12 and bag member 40 move downwardly end 30 of elongated member 12 and bag member 38 move upwardly the heat from heat means 114 begins to impinge on bag member 38 thereby causing the liquid in bag 38 to vaporize into a gas and to expand. As the bag member 38 expands the elongated element 26 moves upwardly and away from elongated member 12 thereby causing pressure to be exerted on chord member 80 which causes dolly member 52 to move along track assembly 46 towards the end 30 of elongated member 12. When dolly member 52 is moved to a certain distance along track assembly 46, the tension on chord 84 will cause elongated element 28 to press on arm 97, thereby releasing latch 90. The weight of dolly member 52 and weights 57 will cause end 30 of elongated member 12 to move downwardly which causes rod member 116 to move upwardly thereby causing work to be exerted on device 120. This process will continually repeat itself with the ends 30, 32 of elongated member 12 alternately being immersed in tank members 94, 96 and positioned such that the heat of heat means 114 will impinge alternately on bag members 38, 40.

Figure 1:
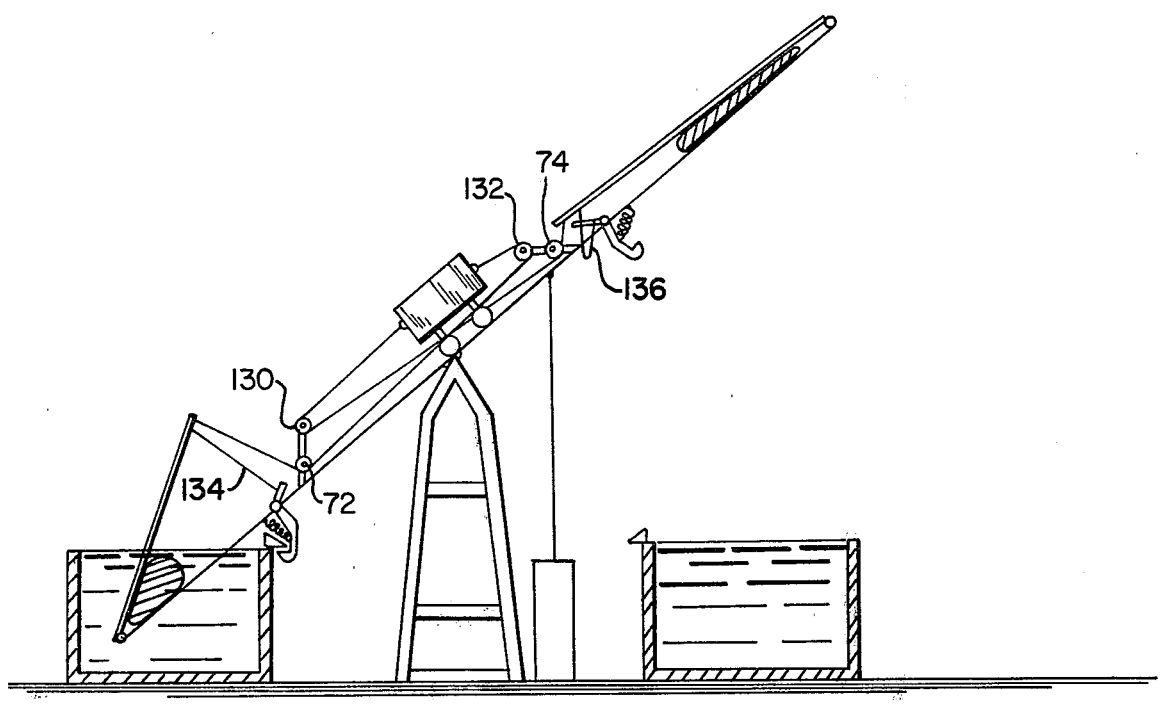
FIG. 1 illustrates a side view of an embodiment of an energy convertor machine.

The embodiment as shown in FIG. 1 of the energy convertor machine 10, shown in FIGS. 2–3, has certain identical elements and cooperation of elements as that previously described in the embodiment, as shown in FIGS. 2–3. These elements are the elongated member 12, support member 16, elongated elements 26, 28, bag members 38, 40, track assembly 46, dolly member 52, tank members 94, 96, pulley members 72, 74, latch members 88, 90 and rod member 116. The modifications to the first embodiment of the energy convertor machine which create the second embodiment is the elimination of the heat means 114. Furthermore, the fluid 106 which is disposed in tank members 94, 96, is at a sufficient temperature such that when bag members 38, 40 are immersed respectively in fluid 106 the liquid within bag members 38, 40 will heat up and expand into a gas. Optionally, a cold air means such as an air conditioner is provided and disposed such that the cold air will impinge upon expanded bag members 38, 40 disposed in space above tank members 94, 96. Other modifications are a first pulley element 130 mounted on the upper surface of elongated member 12 between pulley member 72 and end 76 of track assembly 46. A second pulley element 132 is mounted on elongated member 12 between end 78 of track assembly 46 and pulley member 74. One end of chord member 80 is affixed to end 82 of elongated element 26, wherein chord member 80 extends through pulley member 72 and pulley element 132 and the other end of chord member 80 being affixed to dolly member 52. One end of chord member 84 is affixed to end 86 of elongated element 28, wherein chord member 84 extends through pulley member 74 and pulley element 130 and the other end of chord member 84 is affixed to dolly member 52. One end of a first string member 134 is affixed to elongated element 26 and the other end of string member 134 is affixed to handle portion 95 of latch trigger member 88. One end of a second string member 136 is affixed to elongated element 28 and the other end of string member 136 is affixed to handle portion 97 of latch trigger member 90. Handle portions 95, 97 have been repositioned in the apparatus shown in FIG. 1. In use, the embodiment of the machine 10, shown in FIG. 1, operates identically to the embodiment shown in FIGS. 2–3 except that the bag members 38, 40 expand while immersed in the hot fluid 106 in the tank members 94, 96 and the bag members 38, 40 contract while disposed in the cold air above and outside the fluid 106.

Since obvious changes may be made in the specific embodiment of the invention described herein, such modifications being within the spirit and scope of the invention claimed, it is indicated that all matter contained herein is intended as an illustrative and not as limiting in scope.

What is claimed is:

1. An energy convertor machine which comprises:
   (a) a see-saw device having a stand with an elongated member centered balanced on said stand;
   (b) two sets of elastomeric bag members, each said set having at least one of said elastomeric bag members;
   (c) a liquid having a low vaporization temperature, said liquid being disposed in each of said elastomeric bag member, one said bag members affixed to one end of said elongated member, the other said bag members affixed to another end of said elongated member;
   (d) a means for selectively independently heating and cooling each said set of said elastomeric bag members thereby causing expansion of said elastomeric bag members when heated and causing contraction of said elastomeric bag members when cooled, said means for heating and cooling including a pair of tank members, each of said pair of tank members including a fluid disposed therewithin;
   (e) said heating of one of said sets of said elastomeric bag members occurring simultaneously with said cooling of said other set of said elastomeric bag members; and
   (f) means for pivoting said elongated member, said pivoting means being activated by said expansion and contraction of said elastomeric bag members, said means for pivoting including a movable object movably disposed on said elongated member, said movable object movable between two said bag members on an upper surface of said elongated member, means for controlling the movement of said movable object of said elongated member, said controlling means being in communication with said cooling and heating means, said ends of said elongated member alternately moving upwardly and downwardly as said movable object moves between said bag members on said elongated member, and an elongated rod member affixed to said elongated member, a dolly member having a body with a chamber therein, a plurality of bearing members affixed to said body, at least two axle rods journalled for rotation through said bearing members, a plurality of wheel members, said wheel members being affixed onto said axle members, a track assembly having at least two rails, said track assembly affixed on said upper surface of said elongated member, said wheels of said dolly member movably disposed on said rails of said track assembly, a pair of elongated elements, one said elongated element hinged to one end of said elongated member and engaging an upper surface of one of said bag members, the other said elongated element hinged to the other end of said elongated member and engaging an upper surface of the other bag member, a pair of pulley elements mounted on said upper surface of said elongated member, one of such pulley elements disposed between said first bag member and one end of said track assembly, the other said pulley element being disposed between said second bag member and said other end of said track assembly, a pair of pulley members mounted on such upper surface of said elongated member, one of said pulley members disposed between said first pulley element and said one end of said track assembly, the other said pulley member being disposed between said second pulley element and said other end of said track assembly.

2. An energy convertor machine according to claim 1 wherein said cooling means is ambient air or cooled air from a forced cold air source.

3. An energy convertor machine according to claim 1, wherein said heating means is ambient air or heated air from a hot air source.

4. An energy convertor machine according to claim 1, wherein said fluid in at least one of said pair of tanks is heated.

5. An energy convertor machine according to claim 1, wherein said fluid in at least one of said pair of tanks is cooled.

6. An energy convertor machine according to claim 1, further comprising a pair of chord members, one end of said first chord member affixed to an outer end of said first elongated element, passing through said first pulley element, through said second pulley member, and the other end of said first chord member affixed to said body of said dolly member, one end of said second chord member affixed to an outer end of said second elongated element, passing through said second pulley element, through said first pulley member, and the other end of said second chord member affixed to said body of said dolly member.

* * * * *